United States Patent Office 3,542,889
Patented Nov. 24, 1970

3,542,889
METHOD FOR CONVERTING ETHYLBENZENE TO STYRENE
Charles V. Berger, Western Springs, Ill., assignor to Universal Oil Products Company, Des Plaines, Ill., a corporation of Delaware
No Drawing. Filed May 9, 1968, Ser. No. 728,047
Int. Cl. C07c *15/10*
U.S. Cl. 260—669        8 Claims

ABSTRACT OF THE DISCLOSURE

Method and apparatus for the dehydrogenation of ethylbenzene to styrene. The effluent from the first reaction zone is admixed with additional steam in a compression zone thereby increasing the temperature and pressure of the effluent to a predetermined level for passage into a second reaction zone.

BACKGROUND OF THE INVENTION

This invention relates to an improved method and apparatus for the dehydrogenation of ethylbenzene to styrene. More specifically, this invention relates to a more economical and facile method for obtaining styrene through the steam dehydrogenation of ethylbenzene. It particularly relates to an improved method for achieving thermal balance in the overall dehydrogenation of ethylbenzene using a plurality of reaction zones.

Basic methods are well known in the art for the production of styrene from ethylbenzene. However, the prior art methods have achieved generally poor conversions of ethylbenzene to styrene per pass through the catalytic system. Typically, the prior art processes achieve a conversion of about 30% to 40%. The recovery of styrene in high concentration from such a process requires etxensive distillation apparatus in order to separate the styrene from the unreacted ethylbenzene and other reaction products. Usually, the ethylbenzene is recycled in large quantities, thereby, also necessitating increased sizing of reactor vessels. In short, when the conversion of ethylbenzene to styrene is only in the 30% range, it is extremely difficult to economically produce styrene in high concentration and high purity.

Those skilled in the art recognize the importance of being able to economically produce styrene since this chemical, otherwise called phenylethylene, is extensively employed throughout commerce as the raw material in the production of resins, plastics and elastomers. Specifically, styrene is copolymerized with butadiene to produce a high molecular weight synthetic rubber. Although styrene may be recovered in limited quantities from various coal tars and heavy crude oils, it is preferred to synthesize large quantities by the dehydrogenation of ethylbenzene. The raw material, ethylbenzene, can either be separated from selected petroleum fractions by sugar-distillation, or can be prepared through the alkylation of benzene with ethylene.

The prior art methods for producing styrene are generally carried out by passing a mixture of ethylbenzene and steam over a fixed bed of dehydrogenation catalyst. In order to heat the reactants to reaction temperature, it is also general practice to admix the ethylbenzene, which is at a temperature significantly below reaction temperature, with steam which has been super-heated to a temperature above the reaction temperature so that the mixture is at reaction temperature as it passes over the dehydrogenation catalyst. Since the basic chemical reaction involved, namely the dehydrogenation of ethylbenzene to styrene, is endothermic, there is a significant decrease in the reaction zone temperature as the reaction proceeds. It is not unusual in these prior art processes to witness to drop of perhaps 50° C. to 100° C. within the reaction zone. Naturally, as the temperature decreases, the rapidity of the reaction also decreases so that the overall efficiency of the process declines to a point where it would be economically unattractive unless processing means were found to overcome this disadvantage.

Again, the prior art attempted to solve this problem by drastically increasing the temperature of the super-heated steam so that the difference between the inlet temperature of the reactants and the outlet temperature of the reaction products averaged generally the required reaction temperature. However, it was noted that at the instant the super-heated steam is admixed with the ethylbenzene, the ethylbenzene undergoes decomposition or cracking through the pyrolytic reaction. In many instances, such pyrolysis is effected to such a degree that the process becomes uneconomical due to the loss of ethylbenzene to toluene, benzene, carbon monoxide, carbon dioxide, polymeric materials, tars, etc. Another disadvantage is involved with the utility costs in raising the temperature of large quantities of steam to a level far above that required for effecting the dehydrogenation of the ethylbenzene. Additionally, in spite of all these efforts to control the reaction, the conversion of ethylbenzene to styrene remains at approximately the 30% to 40% level.

More recently, the prior art has suggested means for increasing the level of conversion by utilizing various schemes for admixing the ethylbenzene and steam in such a way as to avoid the pyrolytic reaction. One of the prior art methods has been to split the steam into several portions whereby additional steam is added between catalystic zones in order to reheat the reactants to reaction temperature. In these latter processes, conversions as high as 50% for ethylbenzene to styrene are alleged. However, these latter process schemes do not indicate the method by which the steam and ethylbenzene are heated with the result that utility costs are still prohibitively high for the achievement of the increased conversion level.

SUMMARY OF THE INVENTION

Accordingly, it is an object of this invention to effect a more economic method of dehydrogenating ethylbenzene to produce styrene in high concentration.

It is another object of this invention to provide a method for the dehydrogenation of ethylbenzene to styrene characterized by a high conversion per pass of ethylbenzene to styrene.

It is a specific object of this invention to provide an improved method for heating the reactants to reaction temperature in a more economic and facile manner than has heretofore been possible.

Therefore, the present invention provides an improved method for catalytically dehydrogenating a feed stream containing ethylbenzene in a plurality of reaction zones maintained under conditions sufficient to convert ethylbenzene to styrene which comprises the steps of: (a) introducing said feed stream together with steam into a first reaction zone at a predetermined temperature and pressure; (b) withdrawing from the first zone a first reaction effluent at a lower temperature and lower pressure; (c) admixing said first effluent with additional steam in a compression zone under conditions sufficient to increase said lower temperature and pressure to a higher predetermined level; (d) passing said first effluent at said increased temperature and pressure into a second reaction zone; and, (e) recovering styrene from the effluent of the last reaction zone in said plurality.

Another embodiment of this invention includes the method hereinabove wherein said compression zone comprises steam eductor means.

Thus, it is seen from the embodiments of the present invention presented hereinabove that styrene in high concentration is produced by the dehydrogenation of ethylbenzene in a fixed multi-bed catalytic reaction zone wherein the steam required for the reaction is added thereto in a novel fashion which permits decreased pressure variations within the reactor system. The inventive concept employed in the present invention embodies the novel manner in which the steam and hydrocarbons are not only heated to reaction temperature, but are also increased in pressure to compensate, for example, for the pressure drop through a preceding reaction bed. By the practice of the present invention, conversions of ethylbenzene to styrene per pass exceed 50% by weight and, typically, require no more than a total of five (5) pounds of steam per pound of styrene produced.

The catalyst employed for the dehydrogenation reaction is preferably an alkali-promoted iron catalyst. Typically, such a catalyst may consist of 85% by weight ferric oxide, 2% by weight of chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used, including those comprising ferric oxide-potassium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titanium, alumina-vanadia, etc. Similarly, the various methods of preparing the aforesaid catalysts are well known within the prior art.

The conditions in the first catalyst bed, sufficient to achieve the aforesaid conversion of ethylbenzene to styrene, include not only the catalyst as described and the temperatures specified but also include the weight hourly space velocity. The space velocity as used herein is defined as pounds of ethylbenzene charged per hour per pound of catalyst disposed within reactor 18. Typically, the weight hourly spaced velocity is within the range of about 0.1 to 1.0 and preferably within the range of about 0.2 to about 0.7. The space velocity at any given time is correlated with the selected inlet temperature to result in a reactor product effluent having a temperature within the range of about 1000° F. to 1400° F., typically, 1065° F.

The amount of catalyst contained in each catalyst bed may be varied considerably. Usually, the amount of catalyst is expressed in terms of bed depth which may range from 6 inches to 50 to 60 feet, depending upon such conditions as alkylated aromatic hydrocarbon feed rate and the amount of heat which therefore must be added to effectuate the reaction at an economical rate. Typically, the bed depth may range from 2 feet to 6 feet.

Th reactor pressure may also be varied over a considerable range. Preferably, nearly atmospheric pressure it used although, in some cases, subatmosphereic or significant superatmospheric pressure may be desirable. Sufficient pressure must be maintained at the reactor inlet to overcome the pressure drop through the multi-beds of catalyst contained in the reactor vessels or in separate vessels if each such bed is contained in a separate reactor. Either multiple beds contained in a single reactor, or single bed in multiple recators, or a mixture of these arrangements, may be used in the practice of this invention.

As the reactants contacts the catalyst contained in, for example, the first catalyst bed, there is a temperature and pressure decrease observed across the catalyst bed to the endothermic nature of the reaction and due to the pressure drop characteristics of the reactor design including the presence of catalyst therein. For example, without additional heat being required, the temperature of the effluent leaving the first catalyst bed would probably be in the order of 50° C. or 100° C. or more less than the inlet temperature selected for the combined charge material to the first catalyst bed. Similarly, depending upon the amount of catalyst contained in the first reaction zone, the pressure of the effluent from the first catalyst bed preferably would be less than 10 p.s.i.g. lower than the selected pressure for the combined charge to the first catalyst bed. Typically, the pressure drop through the first catalyst bed would be within the range from 2 to 6 p.s.i.g. and if a similar pressure drop were observed across, for example, three catalyst beds, the total pressure required at the inlet of the first catalyst bed would be significant, e.g., in the range from 6 to 18 p.s.i.g. As those skilled in the art are aware, an increase in pressure within the reaction zone frequently causes an increase in the severity of the other operating conditions necessary to convert ethylbenzene to styrene. The increased severity has been observed to cause an increase in the formation of undesirable by-products including polymer and tar and increases the tendency of the styrene produced to polymerize within the reactor and attendant equipment.

Accordingly, a portion of the total steam required is passed into admixture with the effluent from the first reaction zone into a compression zone which not only raises the temperature of such effluent to the desired temperature for the next reaction zone or bed, but also increases the pressure of the effluent to a predetermined level, generally, in an amount substantially the same as the expected pressure drop through the next succeeding catalyst bed. The method of the present invention proceeds to reheat the effluent from each succeeding reaction zone in substantially the same manner utilizing the injection of super-heated steam into the respective effluent utilizing compression means prior to the introduction into the immediate following reaction zone.

In a commercial installation, the number of reaction zones or beds may vary from 1 to 5, with a typical configuration comprising 3 reaction zones. In the typical commercial application, therefore, the total steam required for the reaction may be proportioned in the following manner with the total steam, preferably not exceeding three (3) pounds of steam per pound of ethylbenzene:

a first portion of the steam to be admixed with the raw charge to the first reaction zone should be from 0.65 to 1.0 pounds per pound;
a second portion of the steam should be injected into the first effluent at a rate from 1.0 to 1.2 pounds per pound; and, third portion of steam should be added to the effluent from the second reaction zone at a rate from 0.80 to 1.35 pounds per pound; with the other reaction conditions being selected such that the total product effluent stream from the last reactor contains from 4 to 6 pounds of steam per pound of styrene in such effluent stream.

As used herein, the compression zone, preferably, comprises a steam eductor means. By definition, the steam eductor means will include ejectors and injectors of the jet pump type, commonly known to chemical engineers. The words "ejector" and "eductor" are used interchangeably herein. Other means of increasing the pressure, such as centrifugal compression means, may also be used with satisfactory results.

As desired, the product effluent from the last reaction zone is usually cooled, the unreacted ethylbenzene separated from the other hydrocarbons and, generally, recycled to the reaction zone, and the styrene in high concentration and high purity is recovered from the remaining effluent from the last reaction zone.

Even though the present invention has been specifically directed to the dehydrogenation of ethylbenzene to styrene, it is within the scope of this invention to apply its concepts broadly to any endothermic catalytic reaction which requires a reheating between catalyst zones or beds. Therefore, other applicable reactions include, by way of example only, those which produce butadiene, indene, cyclopentadiene, or other products, by adjusting the operating variables including catalyst and supplying the proper feed material for processing.

The invention claimed:

1. Method for catalytically dehydrogenating a feed stream containing ethylbenzene in a plurality of reaction zones maintained under conditions sufficient to convert ethylbenzene to styrene which comprises the steps of:
    (a) introducing said feed stream together with steam into the first reaction zone at a predetermined temperature and pressure;
    (b) withdrawing from the first zone a first reaction effluent at a lower temperature and lower pressure;
    (c) admixing said first effluent with additional steam and compressing the resulting mixture in a compression zone under conditions sufficient to increase said lower temperature and pressure to a higher predetermined level;
    (d) passing said first effluent at said increased temperature and pressure into a second reaction zone; and
    (e) recovering styrene from the effluent of the last reaction zone in said plurality.

2. Method according to claim 1 wherein said compression zone comprises steam eductor means.

3. Method according to claim 1 wherein said plurality of zones comprises from three to five reaction zones and wherein the effluent from the second and each succeeding zone is admixed with steam in a compression zone to increase the respective effluent temperature and pressure prior to introducing said respective effluent into its respective succeeding zone.

4. Method according to claim 1 wherein said increased pressure is substantially the same as said predetermined pressure into said first zone.

5. Method according to claim 4 wherein said lower pressure is less than 10 p.s.i.g. lower than said predetermined pressure into said first zone.

6. Method according to claim 1 wherein said increase in pressure is substantially equal to the pressure drop across the reaction zone from which the effluent was taken.

7. In a method for dehydrogenating dehydrogenatable hydrocarbons in a reaction zone comprising a plurality of fixed catalyst beds wherein the reaction is endothermic causing a significant decrease in temperature and pressure across each such bed, the improvement which comprises admixing the total effluent from at least one said catalyst bed with a reheating medium and compressing the resulting mixture in a compression zone to increase said effluent temperature and said effluent pressure, and thereafter introducing the compressed effluent into the next succeeding catalyst bed.

8. Improvement according to claim 7 wherein said reheating medium comprises steam and said dehydrogenatable hydrocarbon comprises ethylbenzene.

References Cited
UNITED STATES PATENTS

| | | | |
|---|---|---|---|
| 2,831,907 | 4/1958 | Mayfield et al. | 260—669 |
| 2,851,502 | 9/1958 | Bowman et al. | 260—669 |
| 3,326,996 | 6/1967 | Henry et al. | 260—669 |

DELBERT E. GANTZ, Primary Examiner

C. R. DAVIS, Assistant Examiner